United States Patent
Chang

(10) Patent No.: US 11,142,102 B2
(45) Date of Patent: Oct. 12, 2021

(54) RECLINING DEVICE FOR VEHICLE SEAT

(71) Applicant: HYUNDAI TRANSYS INCORPORATED, Seosan-si (KR)

(72) Inventor: Seung Hun Chang, Hwaseong-si (KR)

(73) Assignee: HYUNDAI TRANSYS INCORPORATED, Seosan-si (KR)

( * ) Notice: Subject to any disclaimer, the term of this patent is extended or adjusted under 35 U.S.C. 154(b) by 82 days.

(21) Appl. No.: 16/678,034

(22) Filed: Nov. 8, 2019

(65) Prior Publication Data
US 2020/0164775 A1 May 28, 2020

(30) Foreign Application Priority Data

Nov. 28, 2018 (KR) .................. 10-2018-0149967

(51) Int. Cl.
*B60N 2/225* (2006.01)
*B60N 2/22* (2006.01)
*B60N 2/235* (2006.01)
*B60N 2/68* (2006.01)

(52) U.S. Cl.
CPC .......... *B60N 2/2227* (2013.01); *B60N 2/236* (2015.04); *B60N 2/2352* (2013.01); *B60N 2/2356* (2013.01); *B60N 2/682* (2013.01)

(58) Field of Classification Search
CPC .... B60N 2/2252; B60N 2/2356; B60N 2/236; B60N 2/2352; B60N 2/682; B60N 2/2227
See application file for complete search history.

(56) References Cited

U.S. PATENT DOCUMENTS

| | | | | |
|---|---|---|---|---|
| 6,918,635 B2* | 7/2005 | Finner | ................. | B60N 2/2252 297/362 |
| 7,090,298 B2* | 8/2006 | Lange | ................. | B60N 2/2252 297/362 |
| 7,090,299 B2* | 8/2006 | Lange | ................. | B60N 2/2252 297/362 |
| 7,278,689 B2* | 10/2007 | Guillouet | ............ | B60N 2/2252 297/362 |
| 7,281,765 B2* | 10/2007 | Scholz | ................ | B60N 2/2254 297/362 |

(Continued)

FOREIGN PATENT DOCUMENTS

JP 2003-507101 2/2003
JP 4170906 B2 10/2008

(Continued)

*Primary Examiner* — Syed A Islam
(74) *Attorney, Agent, or Firm* — Novick, Kim & Lee, PLLC; Jae Youn Kimj; Jihun Kim

(57) ABSTRACT

Disclosed is a reclining device for a vehicle seat. The reclining device includes: a flange having internal teeth and a cylindrical-shaped flange protrusion; a gear plate having a through hole and external teeth to be partially engaged with the internal teeth of the flange in an eccentric state with the flange; an input device eccentrically positioned inside the through hole of the gear plate and configured of a rotating portion and a head portion; a wedge cam positioned between an the gear plate and the flange protrusion to maintain eccentricity of the gear plate; a support body supporting a load due to the eccentricity of the gear plate and transmitting a rotational force to the wedge cam; and an elastic portion positioned between the support body and the through hole to pressurize the wedge cam.

8 Claims, 7 Drawing Sheets

(56) References Cited

U.S. PATENT DOCUMENTS

| | | | | |
|---|---|---|---|---|
| 7,513,573 B2* | 4/2009 | Wahls | ................. | B60N 2/2254 |
| | | | | 297/362 |
| 8,911,319 B2* | 12/2014 | Chae | ................. | B60N 2/2213 |
| | | | | 475/175 |
| 8,931,842 B2* | 1/2015 | Hiemstra | ............... | B21D 53/28 |
| | | | | 297/362 |
| 9,096,152 B2* | 8/2015 | Zynda | ................. | B60N 2/2252 |
| 9,481,269 B2* | 11/2016 | Kim | .................... | B60N 2/2254 |
| 9,527,410 B2* | 12/2016 | Leconte | ............... | B60N 2/2227 |
| 9,694,720 B2* | 7/2017 | Enokijima | ........... | B60N 2/2252 |
| 9,706,844 B2* | 7/2017 | Sakurai | ................. | A47C 1/024 |
| 10,065,538 B2* | 9/2018 | Desquesne | ............... | B60N 2/20 |
| 2010/0308634 A1 | 12/2010 | Takashi et al. | | |
| 2011/0169312 A1* | 7/2011 | Desquesne | ........... | B60N 2/2252 |
| | | | | 297/362 |
| 2016/0200222 A1 | 7/2016 | Sylvain et al. | | |

FOREIGN PATENT DOCUMENTS

| | | |
|---|---|---|
| JP | 2010-284217 | 12/2010 |
| KR | 10-0785624 B1 | 12/2007 |
| WO | 01/12461 A1 | 2/2001 |
| WO | 2003/024740 A1 | 3/2003 |

* cited by examiner

RECLINING DEVICE FOR VEHICLE SEAT

CROSS REFERENCE TO RELATED APPLICATION

The present application claims priority to Korean Patent Application No. 10-2018-0149967, filed Nov. 28, 2018, the entire contents of which is incorporated herein for all purposes by this reference.

BACKGROUND OF THE INVENTION

Field of the Invention

The present invention relates generally to a reclining device for a vehicle seat and, more particularly, to a reclining device for a vehicle seat, which is capable of angle adjustment in a front and rear direction of a seatback with respect to a seat cushion.

Description of the Related Art

Generally, a seat provided in a vehicle includes a seatback supporting the upper body of a passenger, a seat cushion supporting the lower body such as the buttocks and the thigh of a passenger, and a headrest supporting the back of the head. On a portion where the seatback and the seat cushion are connected, a reclining device that enables the angle adjustment in the front and rear direction of the seatback with respect to the seat cushion is mounted.

The reclining device is divided into two types. A manual type is configured to adjust an angle of the seatback by lever operation by a passenger, and a power type is configured to automatically operate by power of a motor through switch operation.

FIGS. 1 and 2 are an exploded perspective view and an assembled-state top view of a reclining device, respectively, for a vehicle seat according to the related art.

In FIGS. 1 and 2, the reclining device of the related art using a cam structure is shown. The reclining device includes: a flange 1 having an internal gear 1a and a cylindrical-shaped flange protrusion 1b at the center thereof; a gear plate 2 having an external gear 2a engaged with the internal gear 1a and a cylindrical-shaped plate protrusion 2b at the center thereof; an input device 4 having a central protrusion 4a through which a recliner shaft 3 passes and is coupled thereto and a device protrusion 4b integrally formed in an outer side of the central protrusion 4a; a bearing 5 passing through the gear plate 2 and fitted between the outside of the device protrusion 4b and the plate protrusion 2b of the gear plate 2; a first cam 6 and a second cam 7 fitted between the outside of the flange protrusion 1b and the bearing 5; and a spring 8 coupled to the first and second cams 6 and 7 by inserting opposite ends of the spring therein.

The flange 1 is coupled to a seatback bracket, the seatback bracket is coupled to a seatback frame, the gear plate 2 is coupled to a seat cushion bracket via a lower bracket, and the seat cushion bracket is coupled to a seat cushion back frame.

In the input device 4, a disk portion 4c is integrally formed therein by protruding outwards from the central protrusion 4a, and the device protrusion 4b is formed to be connected with the disk portion 4c.

The spring 8 is provided in a state of being close contact with a surface of the disk portion 4c, and the opposite ends of the spring 8 pass through the disk portion 4c and then are respectively inserted into ends of the first and second cams 6 and 7, which face each other.

Spring holes 6a and 7a are respectively formed at the ends of the first and second cams 6 and 7, which face each other, so that the opposite ends of the spring 8 are inserted thereinto.

The bearing 5 is provided between the plate protrusion 2b of the gear plate 2 and the flange protrusion 1b. The central protrusion 4a of the input device 4 is provided to pass through the flange protrusion 1b of the flange 1. At this point, the disk portion 4c covers the bearing 5 and the first and second cams 6 and 7.

Further, the reclining device includes a retainer 9 coupling the flange 1 and the gear plate 2 together.

In the state shown in FIG. 2, when the recliner shaft 3 is rotated clockwise, the input device 4 is rotated clockwise therewith. The rotation of the input device 4 causes the device protrusion 4b to be rotated together, so that the first cam 6 is rotated clockwise.

Then, a first end of the spring 8 coupled to the first cam 6 is moved to a second end thereof coupled to the second cam 7, so that a gap between the opposite ends of the spring 8 is narrowed and at the same time the spring 8 accumulates an elastic force. The accumulated elastic force causes the spring 8 to push the second cam 7 clockwise so that the second cam 7 is rotated clockwise together.

The rotation of the second cam 7 causes the gear plate 2 to be rotated by generating a rotation rate to the flange 1 by the number of teeth between the internal gear 1a and the external gear 2a. As the rotation of the flange 1 causes the seatback to be rotated, the angle adjustment in the front and rear direction may be performed.

FIG. 3 is an interior top view of the reclining device for a vehicle seat according to the related art.

Referring to FIG. 3, in the reclining device of the related art, as the input device positioned in a lateral space A at the opposite ends of the first and second cam 6 and 7 is rotated, the device protrusion of the input device pressurizing the first and second cams 6 and 7 sideways should be arranged in a space, the space having a relatively thin thickness B due to eccentricity of the flange protrusion 1b in the bearing 5.

However, the device protrusion of the input device is manufactured by using a material such as plastic of high manufacturability or aluminum of low strength in order to realize a complicated shape thereof. At this time, there is a problem that deformation occurs therein and bearing capacity is lowered.

As another embodiment, when the device protrusion of the input device is formed at the first and second cams 6 and 7 itself, the lateral space A at the opposite ends of the cams 6 and 7 remains an empty space, thereby increasing the amount of deformation between the bearing 5 and the flange protrusion 1b.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose reclining device for a vehicle seat in which an input device has improved operability and enhanced strength.

In order to achieve the above object, according to one aspect of the present invention, there is provided a reclining device for a vehicle seat. The reclining device includes: a flange having internal teeth at an inner circumferential surface thereof and a cylindrical-shaped flange protrusion at a center portion thereof; a gear plate having a through hole at a center portion thereof, wherein an outer diameter of the gear plate is formed smaller than an inner diameter of the flange, and external teeth are provided along a circumference of the gear plate and partially engaged with the internal teeth of the flange in an eccentric state with the flange; an input device eccentrically positioned inside the through hole of the gear plate and having a rotating portion configured to receive a rotational force through a shaft and a head portion provided at an end of the rotating portion; a wedge cam positioned in a space between an inner circumferential surface of the through hole of the gear plate and the flange protrusion to maintain eccentricity of the gear plate; a support body positioned in the space between the inner circumferential surface of the through hole of the gear plate and the flange protrusion to be adjacent to a lateral side of the wedge cam, the support body being configured to support a load due to the eccentricity of the gear plate and to transmit the rotational force to the wedge cam, as being rotated by receiving the rotational force through the head portion of the input device; and an elastic portion positioned between the support body and the inner circumferential surface of the through hole to pressurize the wedge cam.

The support body may be coupled to the head portion of the input device by being locked thereto at a plurality of coupling points and be rotated by receiving the rotational force of the input device.

The head portion of the input device may be formed by extending laterally outward from an upper end of the rotating portion and cover upper portions of the wedge cam and the support body.

The support body may have a plurality of supports that extrude upwards at positions spaced apart from each other, and as a plurality of protrusions protruding laterally outward from the head portion of the input device is positioned in a separation space between the plurality of supports, the rotational force of the input device may be transmitted to the support body.

Opposite ends of the support body may be positioned to be spaced apart from opposite ends of the wedge cam.

The support body may be formed in a ring shape by extending toward an inside of the wedge cam to cover the flange protrusion.

In order to cover the flange protrusion, an inner circumferential surface of the support body may be brought into contact with an outer circumferential surface of the flange protrusion in an area of extending toward the inside of the wedge cam.

In an area of an inner circumferential surface of the support body, the area being positioned outside opposite ends of the wedge cam, a recess portion may be partially formed therein by being recessed outwards so that the support body does not contact with an outer circumferential surface of the flange protrusion.

A lubricating groove recessed outwards may be formed at an inner circumferential surface of the support body.

The support body may have a plurality of supports that protrude upwards in positions spaced apart from each other, and, the lubricating groove may be positioned in a separation space between the plurality of supports.

According to the reclining device for a vehicle seat of the present invention, the load due to the eccentricity of the gear plate can be supported, as the configuration of the support body is added.

The strength of the input device can be enhanced and the operability thereof can be improved by the engagement between the supports of the support body and the protrusions of the input device.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
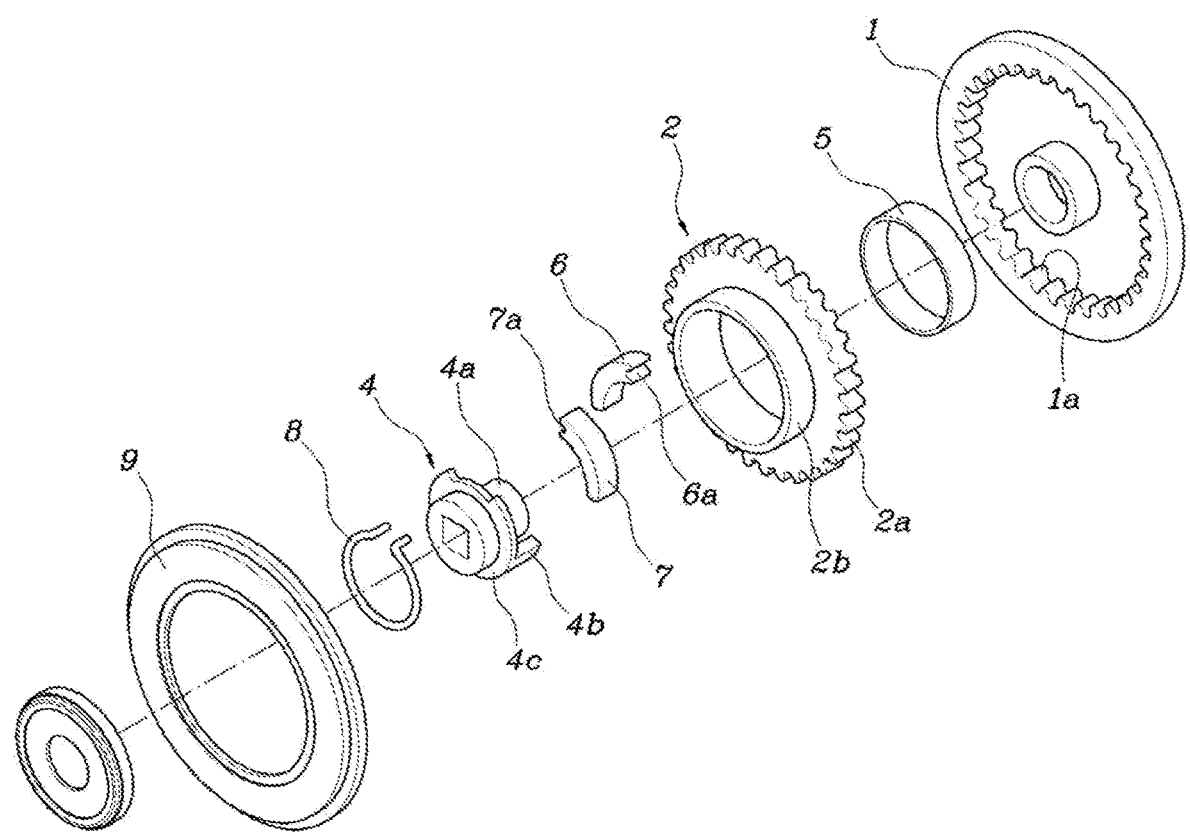
FIGS. 1 and 2 are an exploded perspective view and an assembled-state top view of a reclining device, respectively, for a vehicle seat according to the related art.
Figure 2:
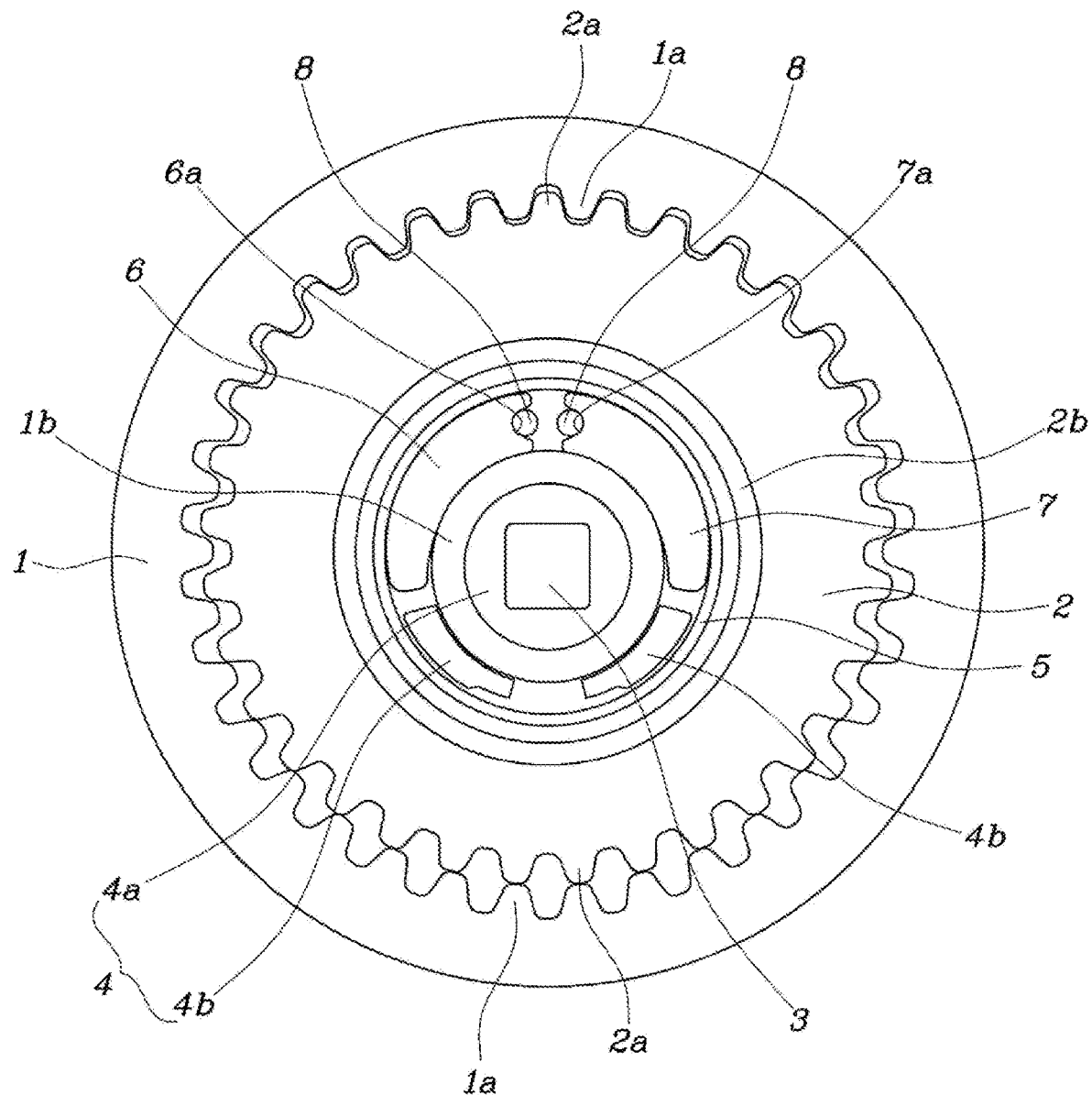
Figure 3:
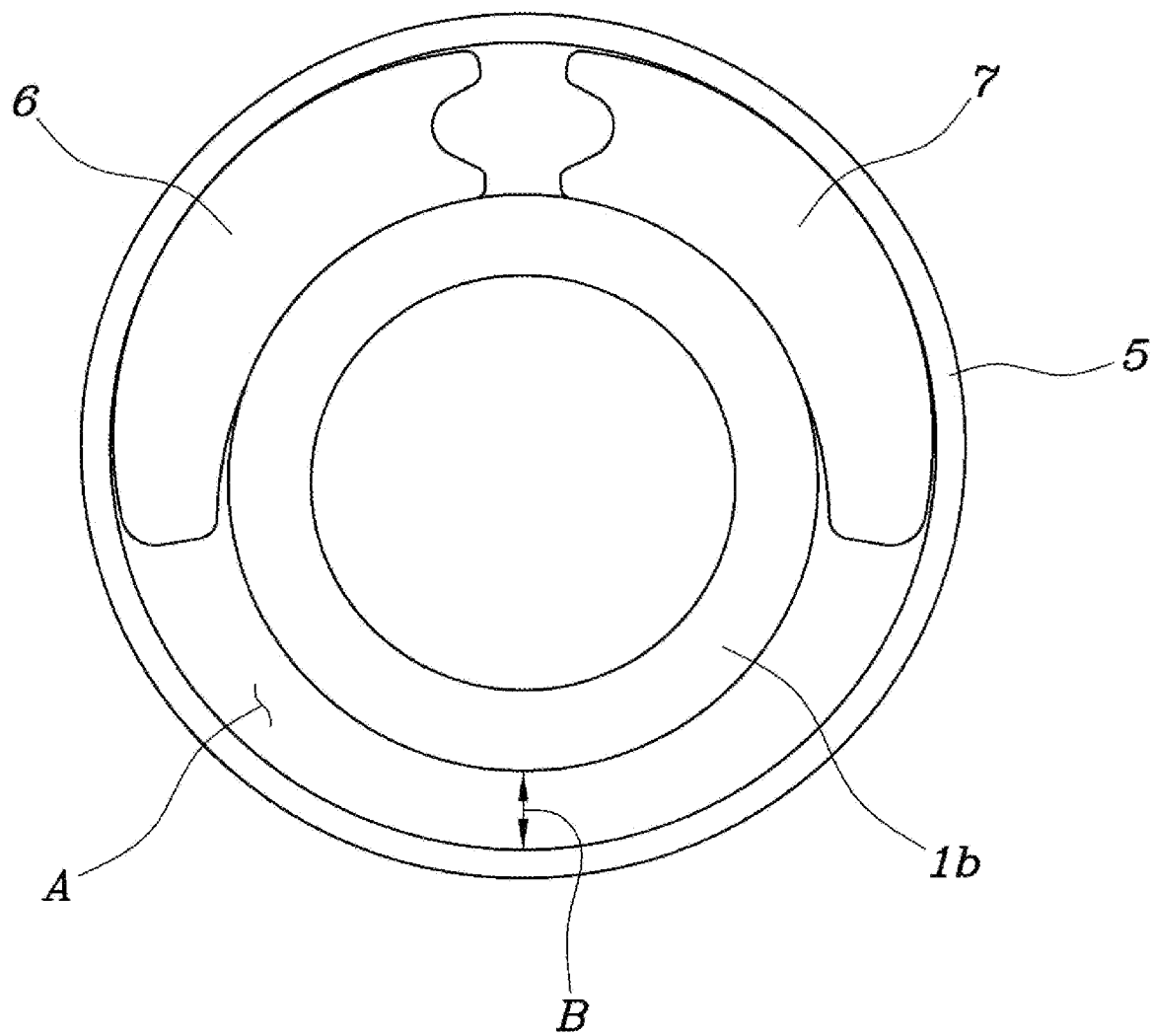
FIG. 3 is an interior top view of the reclining device for a vehicle seat according to the related art.

Specific structural and functional descriptions of embodiments of the present invention disclosed herein are only for illustrative purposes of the embodiments of the present invention. The present invention may be embodied in many different forms without departing from the spirit and significant characteristics of the present invention. Therefore, the embodiments of the present invention are disclosed only for illustrative purposes and should not be construed as limiting the present invention.

Reference will now be made in detail to the embodiments of the present invention, specific examples of which are illustrated in the accompanying drawings and described below, since the embodiment of the present invention can be variously modified in many different forms. While the present invention will be described in conjunction with an exemplary embodiment thereof, it is to be understood that the present description is not intended to limit the present invention to the exemplary embodiment. On the contrary, the present invention is intended to cover not only the exemplary embodiment, but also various alternatives, modifications, equivalents and other embodiments that may be included within the spirit and scope of the present invention as defined by the appended claims.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to" should be construed in the same way.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinbelow, an exemplary embodiment of the present invention will be described in detail with reference to the accompanying drawings. Throughout the drawings, the same reference numerals will refer to the same or like parts.

Figure 4:
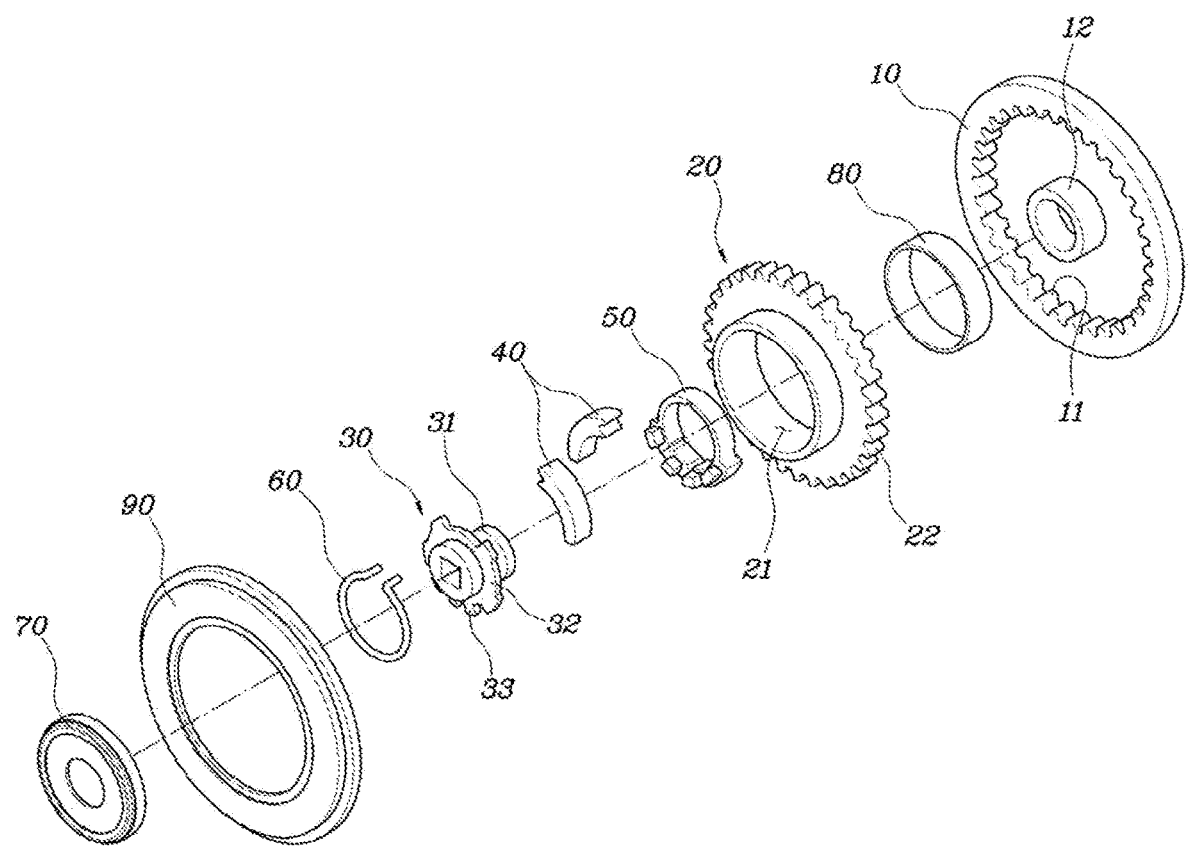
FIG. 4 is an exploded perspective view of a reclining device for a vehicle seat according to an embodiment of the present invention.
Figure 5:
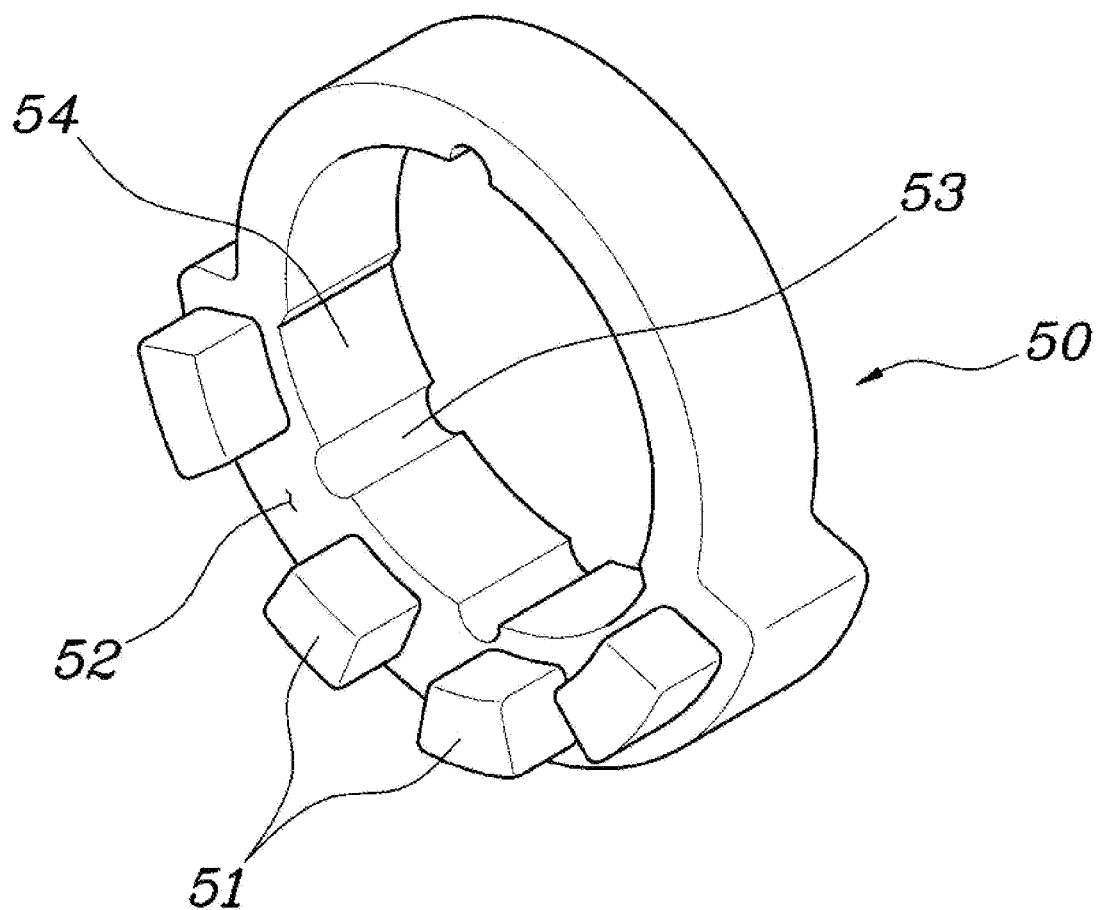
FIG. 5 is a perspective view of a support body according to the embodiment of the present invention.
Figure 6:
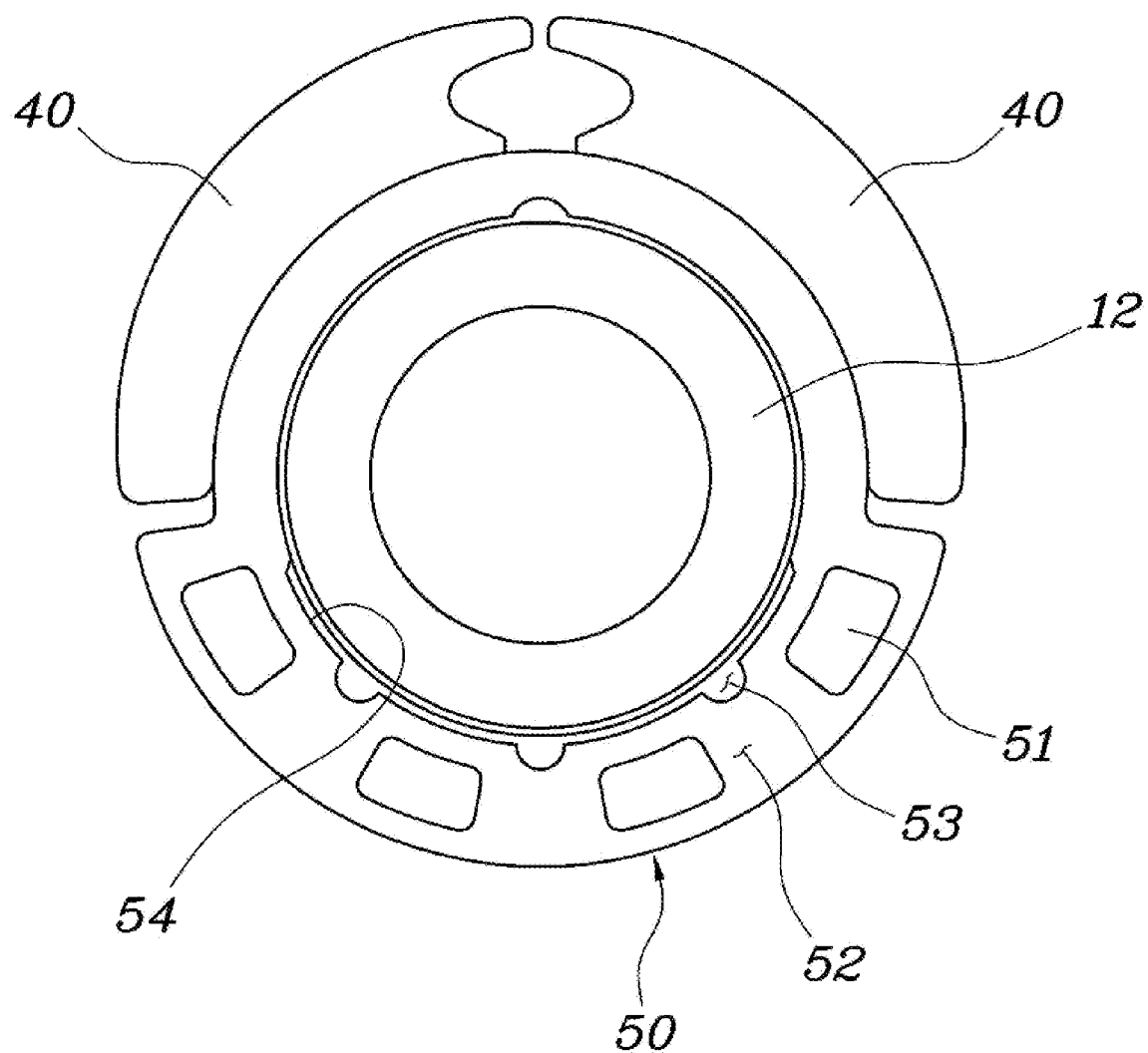
FIGS. 6 and 7 are engaged-state top views of the reclining device for a vehicle seat according to the embodiment of the present invention.
Figure 7:
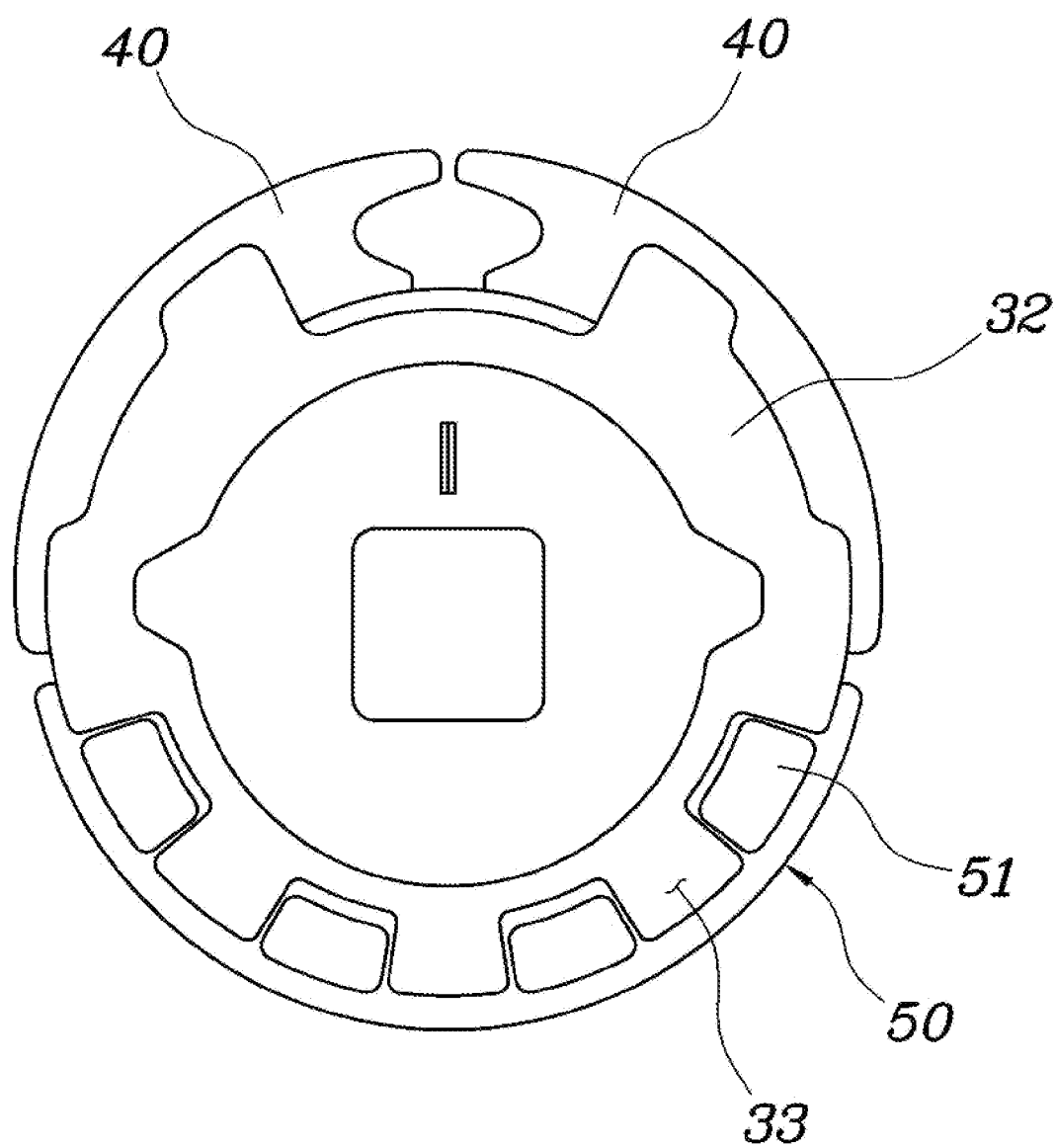

FIG. 4 is an exploded perspective view of a reclining device for a vehicle seat according to an embodiment of the present invention; FIG. 5 is a perspective view of a support body 50 according to the embodiment of the present invention; and FIGS. 6 and 7 are assembled-state top views of the reclining device for a vehicle seat according to the embodiment of the present invention.

Referring to FIGS. 4 to 7, according to the embodiment of the present invention, the reclining device for a vehicle seat includes: a flange 10 that has internal teeth 11 at an inner circumferential surface thereof and a cylindrical-shaped flange protrusion 12 at a center portion thereof; a gear plate 20 that has a through hole 21 at the center thereof, wherein an outer diameter of the gear plate is formed smaller than an inner diameter of the flange 10, and external teeth 22 are provided along a circumference of the gear plate and partially engaged with the internal teeth 11 of the flange 10 in a state where the gear plate is eccentric with the flange 10; an input device 30 that is eccentrically positioned inside the through hole 21 of the gear plate 20 and has a rotating portion (rotating part) 31 configured to receive a rotational force through a shaft and a head portion (head part) 32 provided at an end of the rotating portion 31; a wedge cam 40 that is positioned in a space between an inner circumferential surface of the through hole 21 of the gear plate 20 and the flange protrusion 12 to maintain eccentricity of the gear plate 20; the support body 50 that is positioned in the space between the inner circumferential surface of the through hole 21 of the gear plate 20 and the flange protrusion 12 to be adjacent to a lateral side of the wedge cam 40, the support body 50 being configured to support a load due to the eccentricity of the gear plate 20 and to transmit the rotational force to the wedge cam 40, as being rotated by receiving the rotational force through the head portion 32 of the input device 30; and an elastic element 60 that is positioned between the support body 50 and the inner circumferential surface of the through hole 21 to pressurize the wedge cam 40. The elastic element 60 may be a spring, such as a ring spring, but not limited thereto.

In the flange 10, the internal teeth 11 are provided on the inner circumferential surface of the flange 10 and the flange protrusion 12 is formed in a cylindrical shape at the center thereof.

The gear plate 20 has the outer diameter formed smaller than the inner diameter of the flange 10 and the through hole 21 at the center. The gear plate 20 is coupled to an upper portion of the flange 10 so that the flange protrusion 12 is inserted into the through hole 21. The external teeth 22 of the gear plate 20 are provided along the circumference of the gear plate 20 and is engaged with a part of the internal teeth 11 of the flange 10 in the eccentric state with the flange 10. A retainer 90 may be coupled to the flange 10 at an upper portion of the gear plate 20 to cover tooth engagement between the internal teeth 11 of the flange 10 and the external teeth 22 of the gear plate 20. A cap 70 may be provided to cover the input device 30 and the like inside the retainer 90.

A bearing 80 is provided at the inner circumferential surface of the through hole 21 of the gear plate 20, thus the gear plate 20 may perform relative rotation with the flange 10 and the input device 30 and wedge cam 40 to be described below.

The input device 30 is eccentrically positioned inside the through hole 21 of the gear plate 20 and may be positioned to form a concentric state with the flange 10. The input device 30 includes the rotating portion 31 in which the shaft is inserted and transmits a rotational force to the rotating portion 31. The rotating portion 31 may be inserted into the wedge cam 40 such that a side surface of the rotating portion 31 is brought into contact with a side surface of the wedge cam 40 to be described below. The head portion 32 may be formed at the end of the rotating portion 31. The head portion 32 may cover an upper surface of the wedge cam 40 to be described below at the end of the rotating portion 31.

The wedge cam 40 is positioned in the space between the inner circumferential surface of the through hole 21 of the gear plate 20 and the flange protrusion 12, and may be configured of a pair of wedge cams as shown in the drawings. The wedge cam 40 may be formed in a wedge-shaped cam, thus maintaining eccentricity of the gear plate 20 inside the flange 10.

The elastic element 60 pressurizes the wedge cam 40 between the support body 50 and the inner circumferential surface of the through hole 21. Opposite ends of the elastic element 60 may apply elasticity to the pair of the wedge cams to separate the wedge cams toward opposite sides. The cap 70 may be coupled to an upper portion of the elastic portion 60 to cover the elastic portion 60 and the input device 30 inside the through hole 21 of the gear plate 20.

The support body 50 may be positioned in the space between the inner circumferential surface of the through hole 21 of the gear plate 20 and the flange protrusion 12 to be adjacent to the lateral side of the wedge cam 40. That is, the support body 50 may be positioned between lateral outer sides of opposite ends of the wedge cam 40. The support body 50 may be rotated by receiving the rotational force of the input device 30 through the head portion 32 of the input device 30, and thus transmit the rotational force to the wedge cam 40.

In addition, the support body 50 may support a load due to the eccentricity of the gear plate 20. In particular, the support body 50 support a load generated as the input device 30 is eccentric inside the gear plate 20 and the load generated as the gear plate 20 is eccentric inside the flange 10, so that deformation between the through hole 21 and the flange protrusion 12 may be reduced.

Specifically, the support body 50 may be rotated by being coupled to the head portion 32 of the input device 30 at a plurality of coupling points and receiving the rotational force of the input device 30. That is, the support body 50 receives the rotational force of the input device 30 at the plurality of coupling points. Accordingly, the input device 30 may have improved operability, and enhanced strength because a relative bearing power is required.

The head portion 32 of the input device 30 may extend laterally outward from an upper portion of the rotating portion 31 to cover upper portions of the wedge cam 40 and the support body 50. The rotating portion 31 may be inserted into an inner circumferential surface of the wedge cam 40. The head portion 32 may extend laterally outward from the upper portion of the rotating portion 31 to cover the upper portions of the wedge cam 40 and the support body 50. As the elastic element 60 is positioned at an upper portion of the head portion 32 and the opposite ends of the elastic element 60 extend between the pair of the wedge cams, the head portion 32 may be partially recessed inwards.

The input device 30 may have a plurality of protrusions 33 extruding laterally outward from the head portion 32. The support body 50 may have a plurality of supports 51 protruding upwards at positions spaced apart from each other, so that the input device 30 and the support body 50 are locked to each other at a plurality of locking points.

In particular, the supports 51, which protrude upwards, that is, toward the head portion 32 of the input device 30, may be positioned on the support body 50 by being spaced apart from each other. In addition, the protrusions 33 may be provided on the head portion 32 by protruding laterally outward to be respectively inserted into separation spaces 52 between the supports 51. The rotational force of the input device 30 may be transmitted to the support body 50 by the locking-engagement between the supports 51 and the protrusions 33.

Opposite ends of the support body 50 may be positioned to be spaced apart from the opposite ends of the wedge cam 40. That is, when the input device 30 is in a locked state rather than a rotated state, the opposite ends of the support body 50 may be positioned to be spaced apart from the opposite ends of the wedge cam 40. Thus, the support body 50 may perform relative movement between the opposite ends of the wedge cam 40.

When the input device 30 is rotated, the support body 50 receiving the rotational force of the input device 30 may be moved relative to one end of the wedge cam 40 to pressurize the wedge cam 40.

The support body 50 may be formed in a ring shape by extending toward the inside of the wedge cam 40 to cover the cylindrical-shaped flange protrusion 12 formed at the center of the flange 10. Although the support body 50 may be positioned between the lateral outer sides of the opposite ends of the wedge cam 40 and be spaced apart from the opposite ends of the wedge cam 40, in another embodiment, the support body 50 may be formed by extending toward the inside of the wedge cam 40 to cover the cylindrical-shaped flange protrusion 12 formed at the center of the flange 10. Specifically, in the wedge cam 40, an external circumferential surface of the support body 50 may be formed to be in contact with the inner circumferential surface of the wedge cam 40. Accordingly, when the reclining device is locked, a load of the wedge cam 40 due to the rotational force may be transmitted directly to the support body 50.

In addition, in order to cover the flange protrusion 12, an inner circumferential surface of the support body 50 may be brought into contact with an external circumferential surface of the flange protrusion 12 in an area extending toward the inside of the wedge cam 40. However, an area of the support body 50 outside the opposite ends of the wedge cam 40 may be spaced apart from the flange protrusion 12 not to be in contact with the external circumferential surface of the flange protrusion 12.

Accordingly, since the support body 50 is in contact with the external circumferential surface of the flange protrusion 12 in the area extending to the inside of the wedge cam 40, the load due to the wedge cam 40 may be firmly supported by the support body 50. Since the area of the support body 50 outside the opposite ends of the wedge cam 40 is spaced apart from the external circumferential surface of the flange protrusion 12, a lubricant may be stored in the area or supplied through the area.

In an area of the inner circumferential surface of the support body 50, the area being positioned outside the opposite ends of the wedge cam 40, a recess portion 54 is partially formed at the area by being recessed outwards so that the support body is not in contact with the external circumferential surface of the flange protrusion 12.

The recess portion 54 may be positioned in the area of the support body 50 outside the opposite ends of the wedge cam 40, and may be recessed outwards so that the inner circumferential surface of the support body 50 may have a separation space from the external circumferential surface of the flange protrusion 12. Accordingly, the lubricant may be stored and supplied to the inner circumferential surface of the support body 50 that extends toward the inside of the wedge cam 40 and is in contact with the flange protrusion 12.

In addition, a lubricating groove 53 recessed outwards may be formed at the inner circumferential surface of the support body 50. The lubricant may be stored inside the lubricating groove 53 and may be continuously supplied thereto. Accordingly, smooth relative rotation is possible by a continuous lubrication between the support body 50 and the flange protrusion 12.

A plurality of lubricating grooves 53 may be formed at the area of the support body 50 outside the opposite ends of the wedge cam 40. That is, the lubricating groove 53 may be formed at the recess portion 54 of the support body 50 and stored the lubricant therein.

In addition, the lubricating groove 53 may be positioned in the separation space 52 between the supports 51 formed at the support body 50. Thus, the lubricating groove 53 is covered by the head portion 32 of the input device 30 coupled to the upper portion of the support body 50, thus ensuring the strength of the support body 50.

Accordingly, by the lubricating groove 53 and the area of the support body 50 that is spaced apart from the external circumferential surface of the flange protrusion 12 and is positioned outside the opposite ends of the wedge cam 40, the lubrication may be supplied to the area of the support body 50 that extends toward the inside of the wedge cam 40 and is in contact with the external circumferential surface of the flange protrusion 12. In addition, the lubricating groove 53 may be formed at the area of the support body 50 that extends toward the inside of the wedge cam 40.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A reclining device for a vehicle seat, the reclining device comprising:
    a flange having internal teeth at an inner circumferential surface thereof and a cylindrical-shaped flange protrusion at a center portion thereof;
    a gear plate having a through hole at a center portion thereof, wherein an outer diameter of the gear plate is smaller than an inner diameter of the flange, and the gear plate includes external teeth disposed along a circumference thereof and partially engaged with the internal teeth of the flange in an eccentric state with respect to the flange;
    an input device eccentrically positioned inside the through hole of the gear plate and having a rotating part configured to receive a rotational force through a shaft and a head part disposed at an end of the rotating part;
    a wedge cam positioned in a space between an inner circumferential surface of the through hole of the gear plate and the flange protrusion to maintain eccentricity of the gear plate;
    a support body positioned in the space between the inner circumferential surface of the through hole of the gear plate and the flange protrusion to be adjacent to a lateral side of the wedge cam, the support body being configured to support a load due to the eccentricity of the gear plate and to transmit the rotational force to the wedge cam, as being rotated by receiving the rotational force through the head part of the input device; and
    a spring positioned between the support body and the inner circumferential surface of the through hole to pressurize the wedge cam,
    wherein the support body has a ring shape and extends toward an inside of the wedge cam to cover the flange protrusion, and
    wherein in an area of an inner circumferential surface of the support body, the area being positioned outside opposite ends of the wedge cam, a recess portion is disposed at a part of the area and recessed outwards so that contact between the inner circumferential surface of the support body and an outer circumferential surface of the flange protrusion is prevented.

2. The reclining device of claim 1, wherein the support body is coupled to the head part of the input device by being locked thereto at a plurality of coupling points and is rotated by receiving the rotational force of the input device.

3. The reclining device of claim 1, wherein the head part of the input device extends laterally outward from an upper end of the rotating part and covers upper portions of the wedge cam and the support body.

4. The reclining device of claim 3, wherein the support body has a plurality of supports that extrude upwards at positions spaced apart from each other, and
    the input device has a plurality of protrusions protruding laterally outward from the head part and respectively positioned in separation spaces defined between the respective plurality of supports to transmit the rotational force of the input device to the support body.

5. The reclining device of claim 1, wherein opposite ends of the support body are positioned to be spaced apart from opposite ends of the wedge cam.

6. The reclining device of claim 1, wherein, in order to cover the flange protrusion, the inner circumferential surface of the support body is brought into contact with the outer circumferential surface of the flange protrusion in an area of extending toward the inside of the wedge cam.

7. The reclining device of claim 1, wherein a lubricating groove recessed outwards is formed at an inner circumferential surface of the support body.

8. The reclining device of claim 7, wherein the support body has a plurality of supports that protrude upwards at positions spaced apart from each other, and
    the lubricating groove is positioned in a separation space defined between the plurality of supports.

* * * * *